United States Patent
Azulai et al.

(10) Patent No.: US 9,892,335 B2
(45) Date of Patent: Feb. 13, 2018

(54) REAL-TIME SYSTEM FOR DETERMINING CURRENT VIDEO SCALE

(71) Applicant: International Business Machines Corporation, Armonk, NY (US)

(72) Inventors: Ophir Azulai, Tivon (IL); Udi Barzelay, Haifa (IL); Mattias Marder, Haifa (IL); Dror Porat, Haifa (IL); Slava Shechtman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 15/173,656

(22) Filed: Jun. 5, 2016

(65) Prior Publication Data
US 2017/0351930 A1 Dec. 7, 2017

(51) Int. Cl.
G06K 9/20 (2006.01)
G06K 9/62 (2006.01)
G06T 3/40 (2006.01)
G06K 9/00 (2006.01)

(52) U.S. Cl.
CPC ....... G06K 9/2081 (2013.01); G06K 9/00664 (2013.01); G06K 9/6202 (2013.01); G06T 3/40 (2013.01)

(58) Field of Classification Search
CPC .............................. G06K 9/20; G06K 9/2081
See application file for complete search history.

(56) References Cited

U.S. PATENT DOCUMENTS

| 7,164,810 | B2* | 1/2007 | Schnee ............... G06K 9/2009 235/462.01 |
| 7,466,866 | B2* | 12/2008 | Steinberg .......... G06K 9/00248 348/222.1 |
| 8,340,354 | B2 | 12/2012 | Sharma |
| 8,422,777 | B2* | 4/2013 | Aller .................... G06K 9/3216 382/165 |
| 8,897,575 | B2* | 11/2014 | Ding .................... G06K 9/4642 382/190 |
| 9,251,431 | B2* | 2/2016 | Doepke ............. H04N 5/23245 |
| 9,292,755 | B2* | 3/2016 | Aller .................... G06K 9/3216 |
| 2005/0063566 | A1* | 3/2005 | Beek .................... A61B 5/0059 382/115 |

(Continued)

OTHER PUBLICATIONS

Punam K. Saha et al., "Scale-Based Diffusive Image Filtering Preserving Boundary Sharpness and Fine Structures", Medical Imaging, IEEE Transactions on (vol. 20, Issue: 11), pp. 1140-1155, Nov. 2001.

(Continued)

Primary Examiner — Anand Bhatnagar

(57) ABSTRACT

Embodiments of the present invention may provide the capability to identify a specific object being interacted with that may be cheaply and easily included in mass-produced objects. In an embodiment, a computer-implemented method for object identification may comprise receiving a signal produced by a physical interaction with an object to be identified, the signal produced by an identification structure coupled to the object during physical interaction with the object, processing the signal to form digital data representing the signal, and accessing a database using the digital data to retrieve information identifying the object.

20 Claims, 6 Drawing Sheets

(56) References Cited

U.S. PATENT DOCUMENTS

| | | | |
|---|---|---|---|
| 2006/0257050 A1* | 11/2006 | Obrador | G06T 7/0002 |
| | | | 382/286 |
| 2008/0259223 A1* | 10/2008 | Read | H04N 9/3147 |
| | | | 348/745 |
| 2009/0115872 A1* | 5/2009 | Lazaridis | H04M 1/72522 |
| | | | 348/231.99 |
| 2011/0222745 A1* | 9/2011 | Osterhout | G02B 27/017 |
| | | | 382/118 |
| 2011/0243431 A1* | 10/2011 | Sangappa | G06K 9/00228 |
| | | | 382/164 |
| 2012/0008832 A1 | 1/2012 | Wang et al. | |
| 2015/0178584 A1* | 6/2015 | Aller | G06K 9/3216 |
| | | | 382/165 |
| 2015/0347861 A1* | 12/2015 | Doepke | H04N 5/23245 |
| | | | 382/199 |

OTHER PUBLICATIONS

Ruxandra Tapu., "Salient object detection in video streams", Electronics and Telecommunications (ISETC), 2012 10th International Symposium on Date of Conference: Nov. 15-16, 2012, pp. 275-278.

\* cited by examiner

REAL-TIME SYSTEM FOR DETERMINING CURRENT VIDEO SCALE

BACKGROUND

The present invention relates to techniques for aiding a user in determining the rough scale of a viewed scene in a photo or video at the time of capture, so that a relevant computer-vision algorithm may be tuned accordingly.

Computer vision typically involves computerized acquisition, processing, analysis, and understanding of images in order to obtain information about the real world. Scale estimation is an inherent problem in computer vision. For example, knowing the scale or the range of scales of a viewed scene is a prerequisite for almost any computer vision task. In order to obtain useful information about the image, and the real world represented by the image, the scale of the image must be known. Knowing the scale allows the sizes of objects depicted in the image to be determined.

Typically, computer vision processes are adjusted or tuned in order to improve their accuracy. When tuning arguments for such processes, typically the user edits a configuration file, or controls the parameters through various forms of controls such as slider bars, text fields, etc. These solutions have in common that the user needs to know metric data of the scene in order to determine the appropriate value(s) of the image scale. This is difficult because the average user does not know the image dimensions and/or the dimensions of objects seen in the photo/video. Further, in many fields the operator of the computer vision process may not even be familiar with the concept of scale and resolution.

Accordingly, a need arises for techniques by which the scale of a viewed scene in a photo or video may be determined quickly and easily at the time of capture.

SUMMARY

Embodiments of the present invention may provide the capability to aid a user in determining the rough scale of the viewed scene in a photo or video at the time of capture (thus in real-time), so that the relevant computer-vision algorithm may be tuned accordingly. Embodiments of the present invention may provide a simple interface for a user to determine the scale of a scene, without the user needing to actually understand the concepts of scale or resolution. For example, the user may be asked to adjust a geometric shape, such as a rectangle, that may be displayed on top of the image, so that the size of the rectangle may correspond to the known dimensions of one or more objects in the viewed scene.

In an embodiment of the present invention, a computer-implemented method for object recognition may comprise displaying a video or image in real-time, displaying an interactive geometric shape adapted to be adjusted by a user to select an object in the displayed video or image, obtaining an aspect ratio of the interactive geometric shape, comparing the obtained aspect ratio to aspect ratios of a plurality of object templates, identifying at least one object having an aspect ratio corresponding to the aspect ratio of the interactive geometric shape, determining a resolution of the video or image based on the identified object.

The method may further comprise locating an object in the video or image by resizing the video or image to a scale based on the determined resolution. Identifying at least one object having an aspect ratio corresponding to the aspect ratio of the interactive geometric shape may comprise identifying a plurality of objects having aspect ratios corresponding to the aspect ratio of the interactive geometric shape, wherein each of the plurality of identified objects has different dimensions, and determining a plurality of different resolutions of the video or image based on the plurality of identified objects. The method may further comprise locating an object in the video or image by resizing the video or image to a scale based on the determined plurality of different resolutions. The method may further comprise setting an image processing parameter based on the determined resolution. The determining a resolution of the video or image based on the identified object may comprise reducing a space of possible resolutions by limiting the possible resolutions to resolutions corresponding to the identified at least one object. The method may further comprise receiving from a user input including additional information about the object.

In an embodiment of the present invention, a computer program product for object recognition may comprise a non-transitory computer readable storage having program instructions embodied therewith, the program instructions executable by a computer, to cause the computer to perform a method comprising displaying a video or image in real-time, displaying an interactive geometric shape adapted to be adjusted by a user to select an object in the displayed video or image, obtaining an aspect ratio of the interactive geometric shape, comparing the obtained aspect ratio to aspect ratios of a plurality of object templates, identifying at least one object having an aspect ratio corresponding to the aspect ratio of the interactive geometric shape, and determining a resolution of the video or image based on the identified object.

In an embodiment of the present invention, a system for object recognition, the system may comprise a processor, memory accessible by the processor, and computer program instructions stored in the memory and executable by the processor to perform displaying a video or image in real-time, displaying an interactive geometric shape adapted to be adjusted by a user to select an object in the displayed video or image, obtaining an aspect ratio of the interactive geometric shape, comparing the obtained aspect ratio to aspect ratios of a plurality of object templates, identifying at least one object having an aspect ratio corresponding to the aspect ratio of the interactive geometric shape, and determining a resolution of the video or image based on the identified object.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide the capability to aid a user in determining the rough scale of the viewed scene in a photo or video at the time of capture (thus in real-time), so that the relevant computer-vision algorithm may be tuned accordingly. Embodiments of the present invention may provide a simple interface for a user to determine the scale of a scene, without the user needing to actually understand the concepts of scale or resolution. For example, the user may be asked to adjust a geometric shape, such as a rectangle, that may be displayed on top of the image, so that the aspect ratio of the rectangle may correspond to the known dimensions of one or more objects in the viewed scene.

Figure 1:
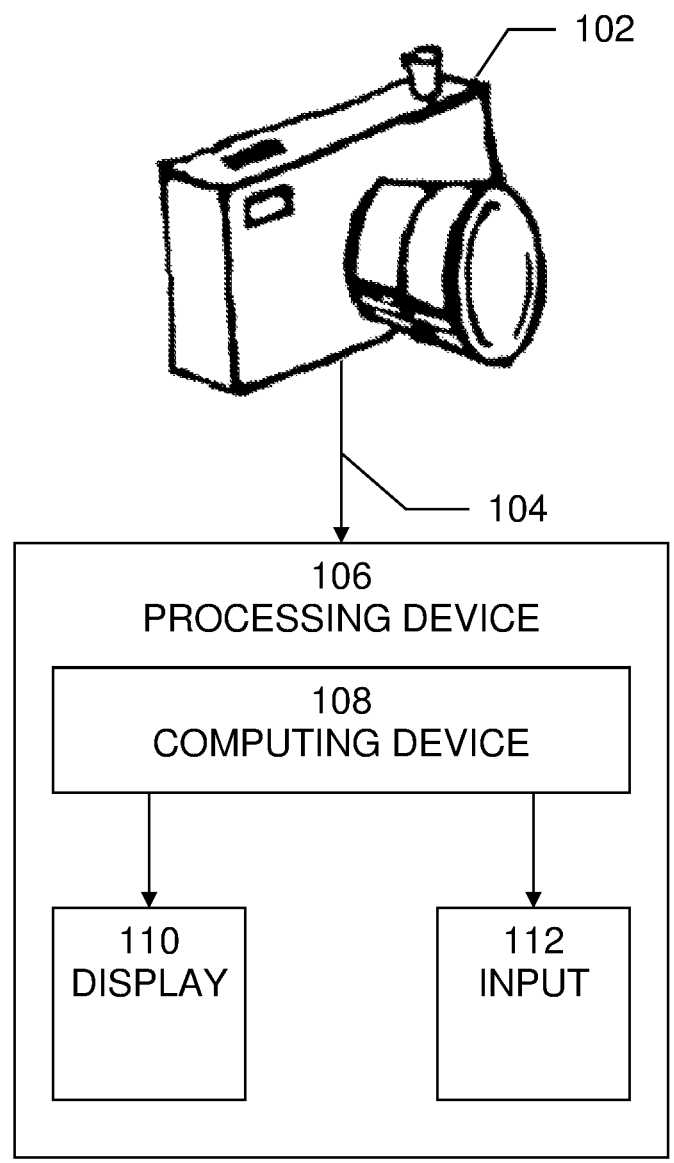
FIG. 1 is an exemplary diagram of a system in which embodiments of the present invention may be implemented.

An exemplary diagram of a system in which embodiments of the present invention may be implemented is shown in FIG. 1. In the example shown in FIG. 1, an image capture device 102, such as a video or still camera, or both, may be used to capture one or more still images and/or one or more videos. The captured still images and/or videos may be transmitted over a communication connection 104, such as a wired or wireless, direct or networked connection, to a processing device 106. Processing device 108 may, for example, include a computing device 108, a display device 110, and an input device 112.

Figure 2:
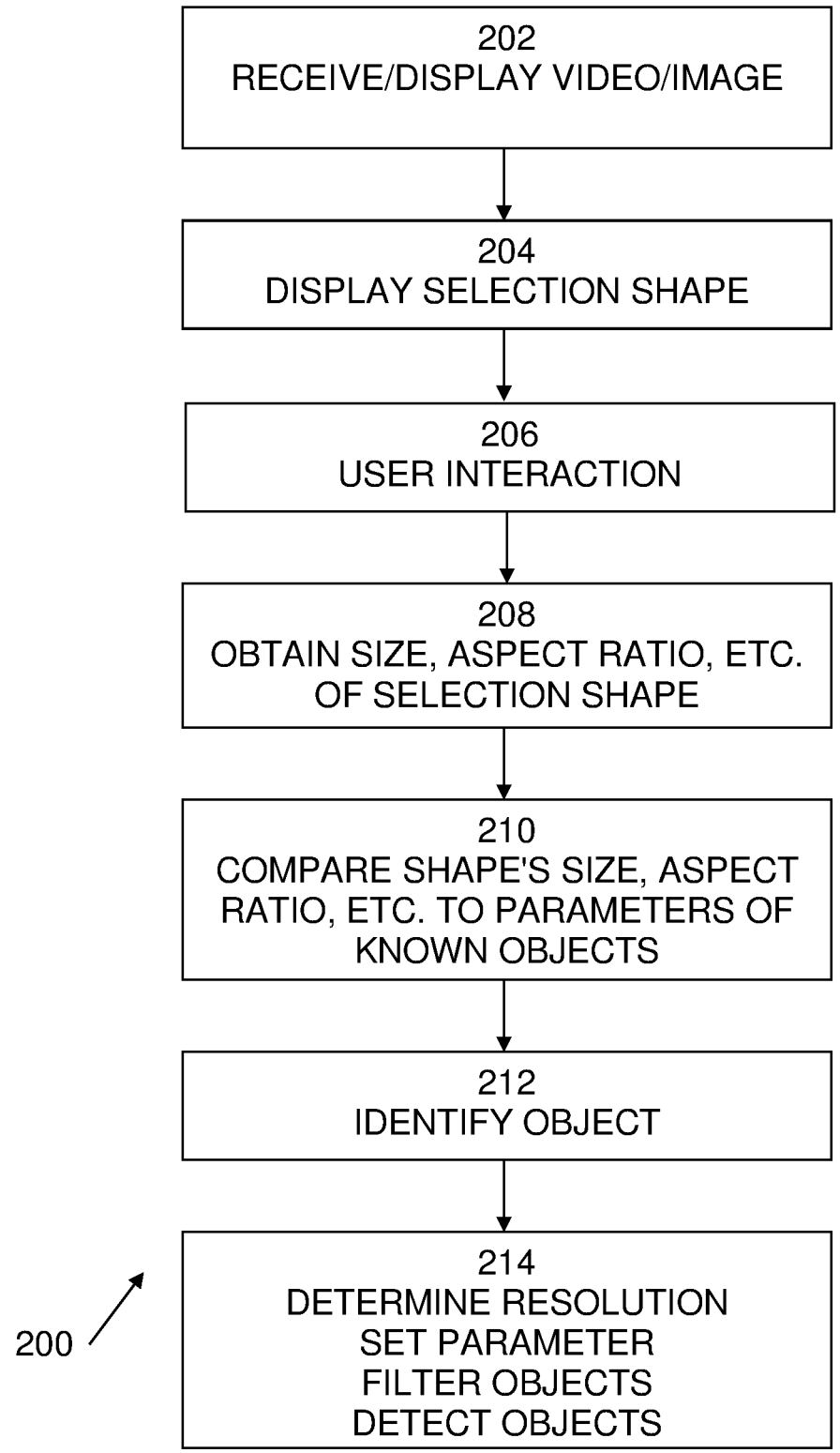
FIG. 2 is an exemplary flow diagram of processing that may be performed by embodiments of the present invention.
Figure 3:
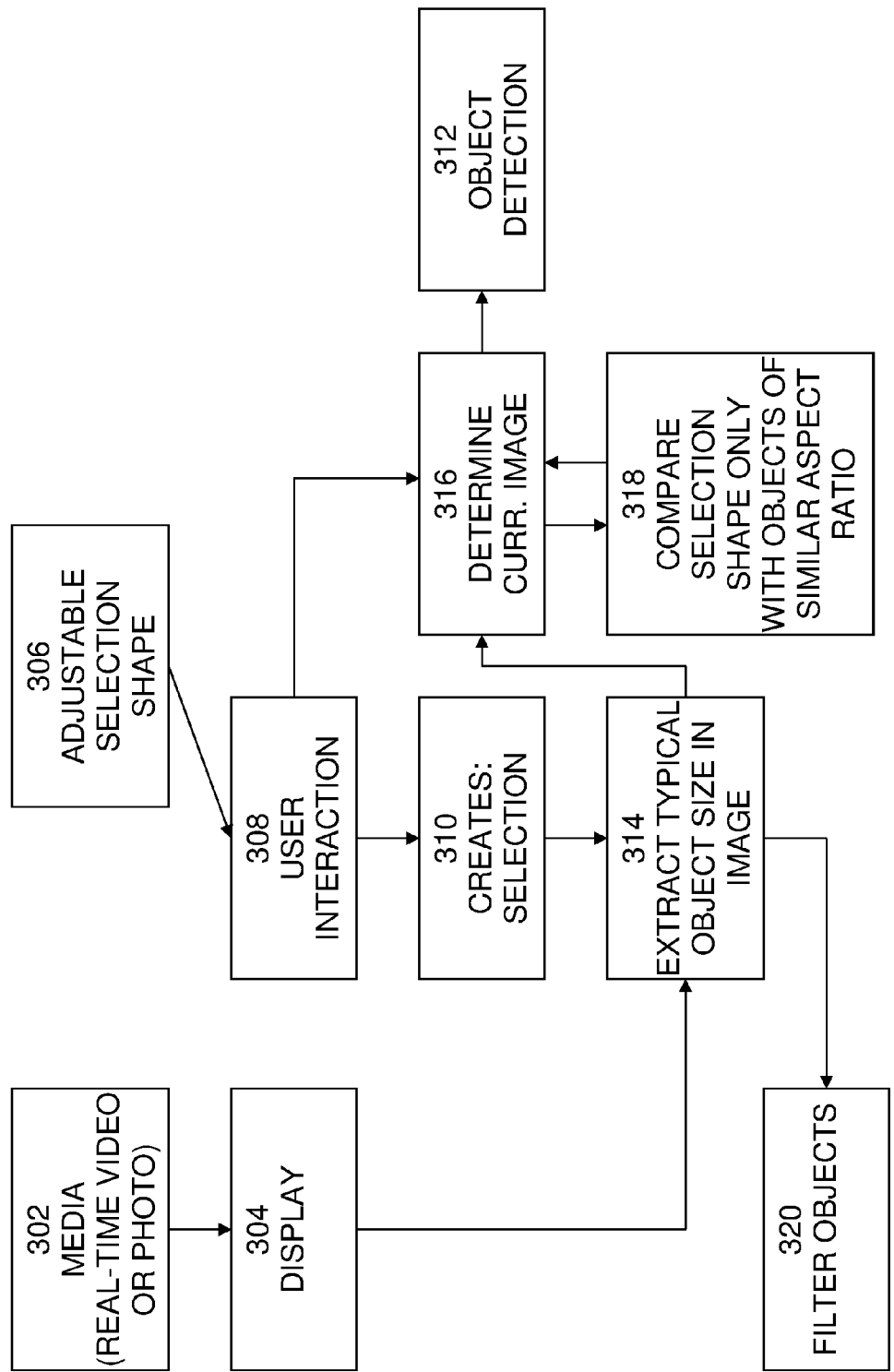
FIG. 3 is an exemplary block diagram of processing that may be performed by embodiments of the present invention.

An exemplary flow diagram of processing 200 that may be performed by embodiments of the present invention is shown in FIG. 2. It is best viewed in conjunction with FIG. 3, which is a block diagram of such processing. In this example, at 202, media 302, such as a real-time video or photographic image may be received by a processing device, such as processing device 108, shown in FIG. 1. Media 302 may be displayed to a user with display device 304. At 204, processing device 108 may provide a selection shape 306, which typically may be a rectangle, but may be any geometric shape or combination of shapes. Selection shape 306 may be displayed in conjunction with media 302 on display device 304. Likewise, selection shape 306 may be provided in conjunction with simple instructions, such as "mark an object" or "change to object size."

At 206, the location and size of selection shape 306 as displayed on display device 304 may be adjusted by user interaction 308 with processing device 108, for example, using an input device, such as input device 112, shown in FIG. 1. The user may adjust the location and size of selection shape 306 to overlay an object shown in media 302. At 208, after the user adjusts the selection shape to fit an object in the image, the final selection shape 310 may be used to extract the size of the object selected by selection shape 310. To do this, at 210, an object detection system 312 may detect, separate, and segment objects in media 302, and then may compare the detected objects with a predefined list of objects, where the multi-dimensional sizes of the objects in the list may be provided, as well as and other object identifying information. The final selection shape 310 may be used to narrow the search to objects having the dimensions provided by the final selection shape 310. Once, at 212, an object is recognized from the provided list and the dimensions of the object are known as well, processing device 108 may, at 214, perform additional processing, such as determining the resolution 316 of the entire image viewed by a user, setting one or more image processing parameters, object filtering 320, object determination, etc.

As an enhancement, at 210, during the object search, the selection shape may be compared only with objects having an aspect ratio similar to that of the selection shape 318. An additional enhancement may include, for example, prompting the user to choose a type or classification for the selected object. For example, the user may be prompted to differentiate among bottle, can, box, or other. Likewise, the user may be prompted to differentiate among what kind of product the selected object is. For example, the user may be prompted to differentiate among dairy products, drinks, etc.

An additional enhancement may include, for example, prompting the user to enter additional metadata, to further focus the product search. For example, such metadata may include a Product Stand number/type, etc.) Likewise, an additional enhancement may include, for example, inherently using any metadata available from the video or photograph.

The object recognition may be limited to recognition by aspect ratio or shape, and thus there may be some uncertainty about what object has actually been selected. In this case, the image resolution may only be given as a range or even as multiple disconnected ranges of resolutions.

Figure 4:
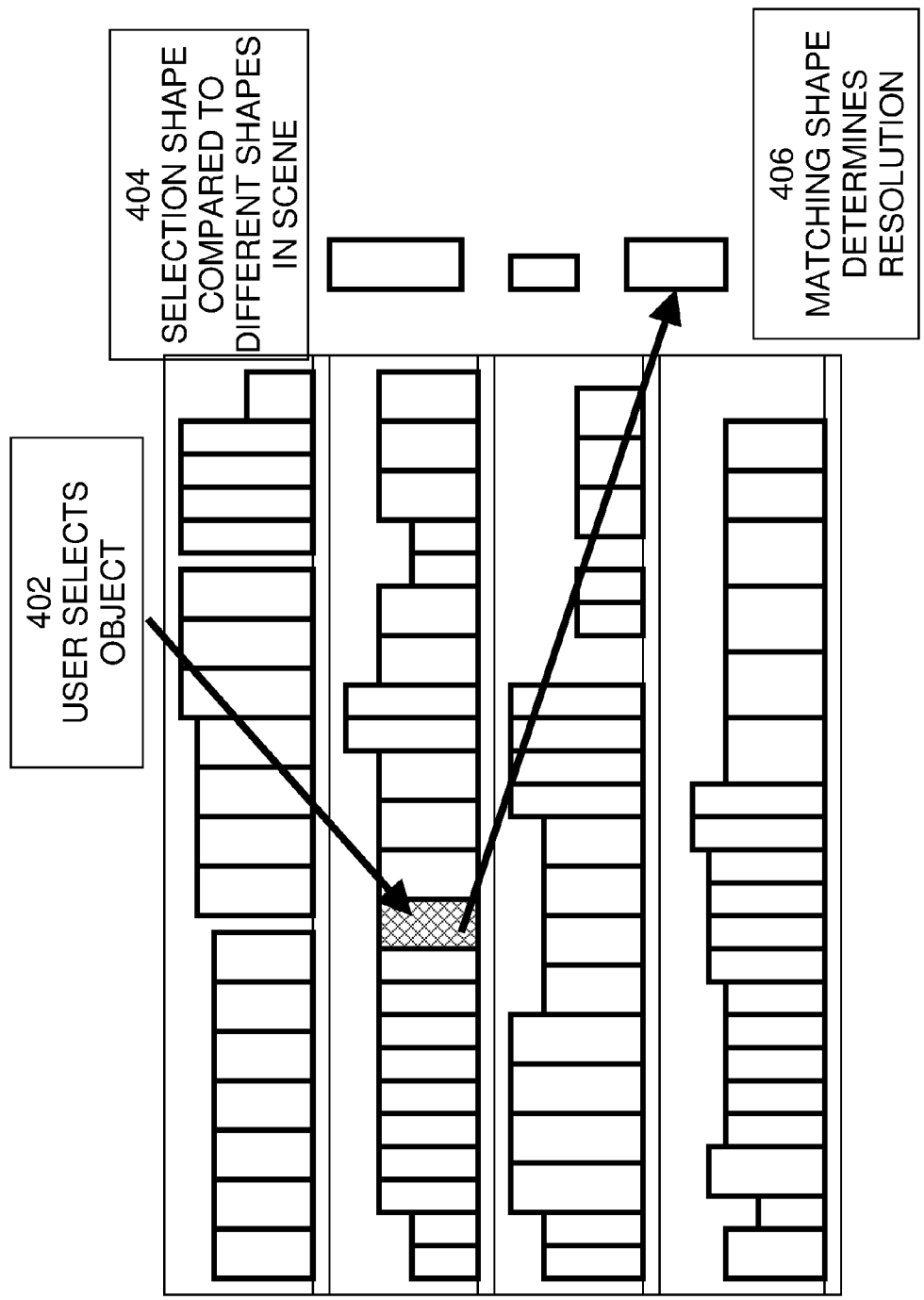
FIG. 4 illustrates an example of an interactive display that may be used to adjust a selection shape and select an object.

An example of an interactive display that may be used to adjust a selection shape and select an object is shown in FIG. 4. As shown in FIG. 4, at 402, a user may select an object by adjusting the selection shape to fit an object in the image. At 404, the selection shape may be compared to different shapes in the scene. In this example, the selection shape most closely matches the shape of object 4. Accordingly, at 406, the dimensions of object 4 may be used to determine the resolution of the image.

Figure 5:
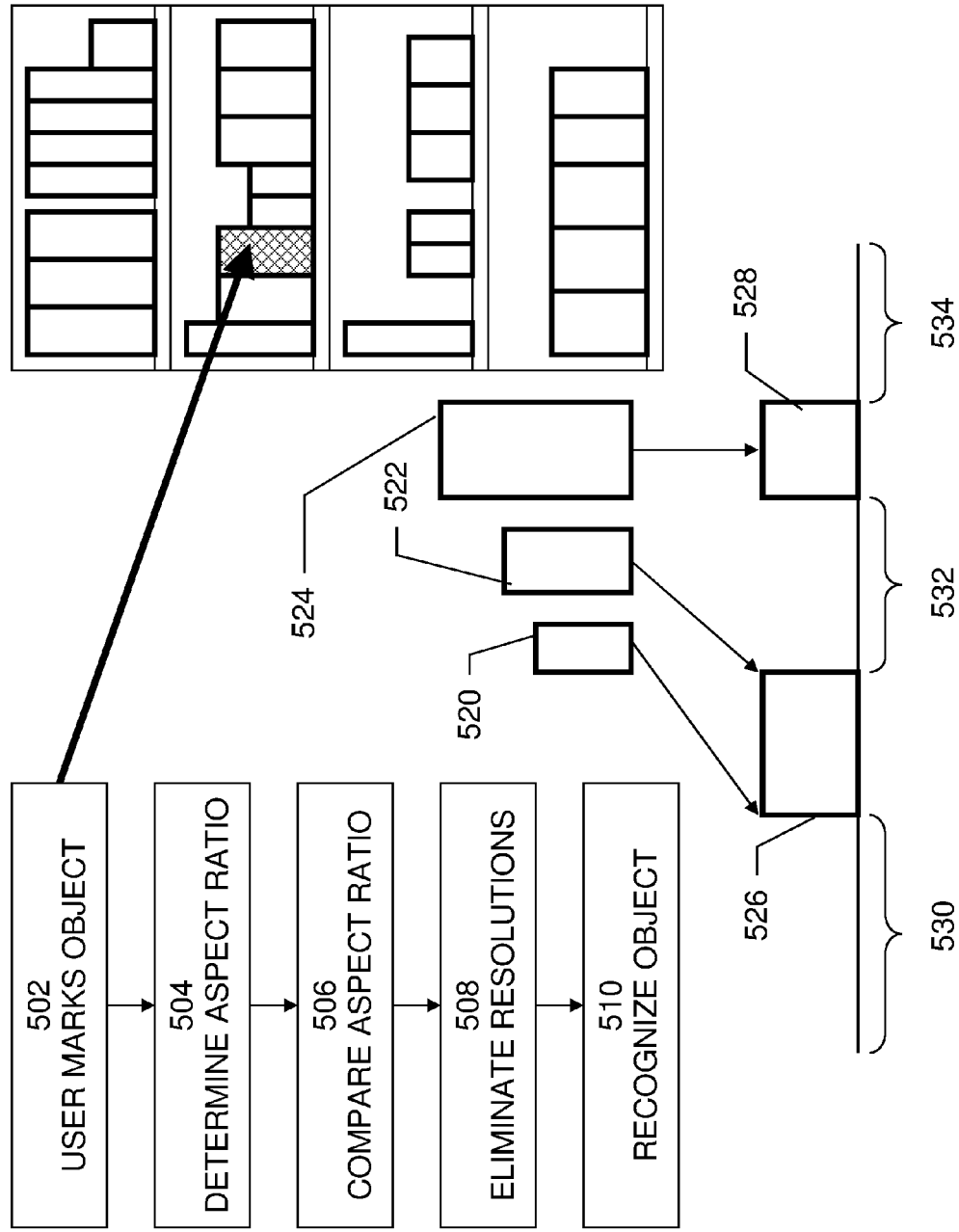
FIG. 5 illustrates an example of a technique for recognizing objects, such as products, in an image.

An example of a technique for recognizing objects, such as products, in an image is shown in FIG. 5. In this example, at 502, a user may mark an object using a selection shape that fits the bounding box of one of the objects in the image. In 504, the aspect ratio of the object, as determined by the aspect ratio of the selection shape, may be determined, For example, the aspect ratio may be the width of the rectangle divided by the height of the rectangle or vice versa. At 506, the determined aspect ratio may be compared to a list or database of aspect ratios to obtain a list of objects or products having a similar aspect ratio. Typically, because the aspect ratio is a number, rather than pixels or image features, this processing may be relatively fast and inexpensive. At 508, the objects on the obtained list of objects or products may be used to eliminate a portion of the possible scales for the image. Each object on the obtained list, such as objects 520-524, may have a known size and/or dimensions. As each object corresponds to a particular image scale or resolution, such as 526 and 528, those image scales or resolutions, such as 530-534, corresponding to objects that are not on the obtained list, may be eliminated from consideration.

For example, if the selection shape is 100 by 100 pixels, the aspect ratio is 1.00. Then only objects having approximately that aspect ratio will be on the obtained list. These objects may be different sizes, and thus correspond to different image scales or resolutions. Other image scales or resolutions may then be eliminated from consideration. Once the space of possible image scales or resolutions of the image has been reduced, then, at 510, the object may be recognized. For example, comparison of the actual image marked by the selection shape with stored object images may be performed, but these comparisons need only be performed with stored object images that have not been eliminated by the elimination of possible image scales or resolutions. This may provide faster processing for recognizing objects in the image.

Typically, the user need not mark a predetermined object. Rather, the user may typically mark any object in the image. In addition, the user may provide additional information about the image or the selected object.

Setting an algorithm parameter through an interactive geometric shape floating on top of image/video viewer.

A system containing a display showing real-time video or photo, an interactive display of a geometric shape (rectangle) that the operator uses to select an object of interest, a method for filtering out objects that do not match the typical object size and or a method for estimating the range of image resolutions (scales) in the image/video. In addition the system can compare the selection shape only to objects of similar aspect ratio (or other geometric criterion, such as shape), and thus get a more accurate measurement of the current seen image resolution.

The system may be real-time and give instant response as none of the modules are computationally intensive.

Figure 6:
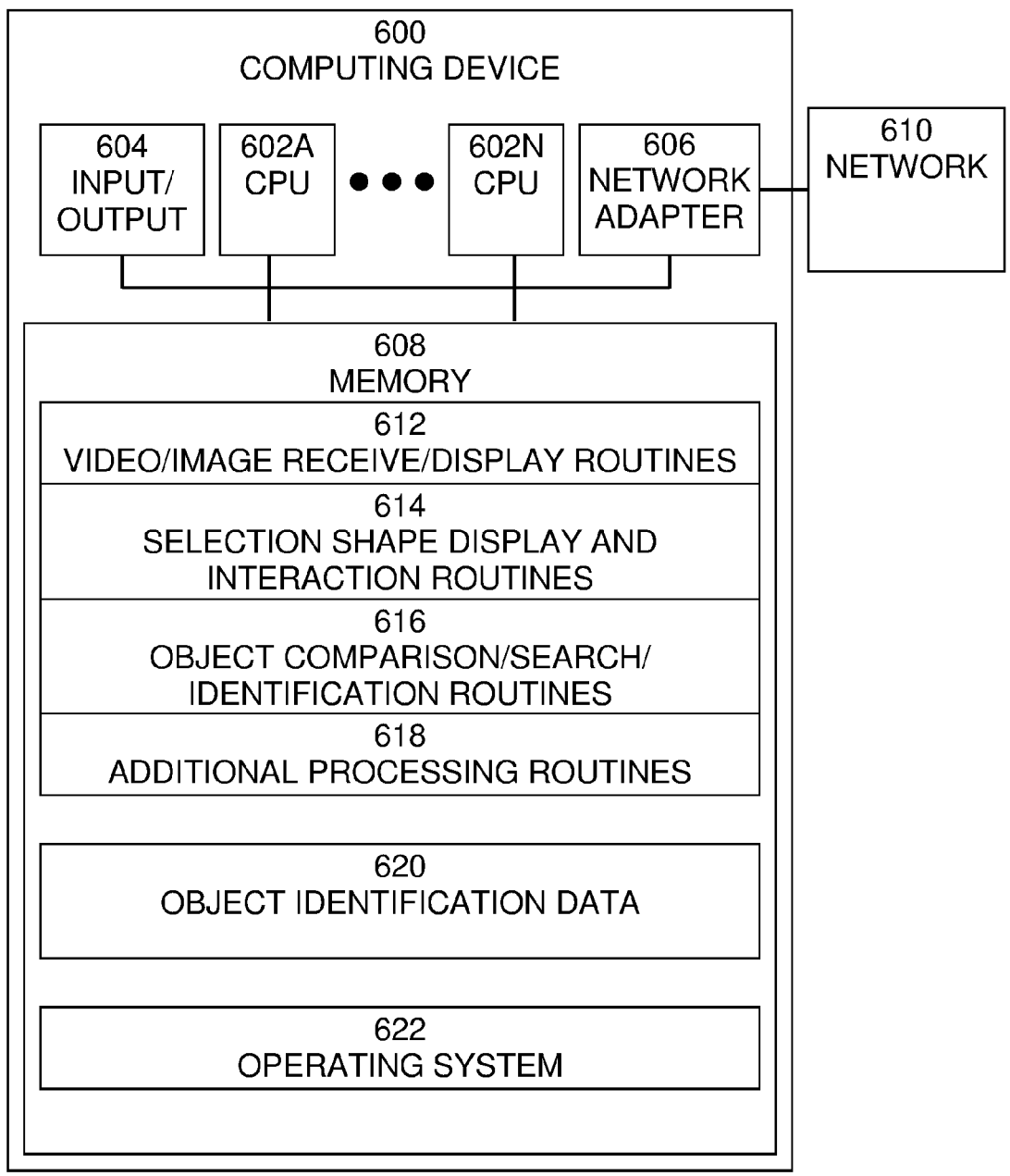
FIG. 6 is an exemplary block diagram of a computer system in which processes involved in the embodiments described herein may be implemented.

An exemplary block diagram of a computing device 600, in which processes involved in the embodiments described herein may be implemented, is shown in FIG. 6. Computing device 600 is typically a programmed general-purpose computer system, such as an embedded processor, system on a chip, personal computer, workstation, server system, and minicomputer or mainframe computer. Likewise, computing device 600 may be implemented in a wrist-worn, or other personal or mobile device, and may include sensor circuitry as well as display circuitry to display object identification information. Computing device 600 may include one or more processors (CPUs) 602A-602N, input/output circuitry 604, network adapter 606, and memory 608. CPUs 602A-602N execute program instructions in order to carry out the functions of the present invention. Typically, CPUs 602A-602N are one or more microprocessors, such as an INTEL PENTIUM® processor. FIG. 6 illustrates an embodiment in which computing device 600 is implemented as a single multi-processor computer system, in which multiple processors 602A-602N share system resources, such as memory 608, input/output circuitry 604, and network adapter 606. However, the present invention also contemplates embodiments in which computing device 600 is implemented as a plurality of networked computer systems, which may be single-processor computer systems, multi-processor computer systems, or a mix thereof.

Input/output circuitry 604 provides the capability to input data to, or output data from, computing device 600. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computing device 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computing device 600 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present invention contemplates any and all such arrangements.

In the example shown in FIG. 6, memory 608 may include video/image receive/display routines 612, selection shape display and interaction routines 614, object comparison/search/identification routines 616, additional processing routines 608, object identification data 620, and operating system 622. For example, video/image receive/display routines 612 may include routines that receive and display video or images. Selection shape display and interaction routines 614 may include routines to display a selection shape on a displayed video or image and provide the capability for a user to interact and adjust the size and location of the selection shape on the displayed video or image. Object comparison/search/identification routines 616 may include routines to extract the size of the object selected by the selection shape, detect, separate, and segment objects in the displayed video or image, compare the detected objects with object identification data 622, and identify the object based on object identification data 622. Object identification data 620 may, for example, be a predefined list of objects or a database that may include the multi-dimensional sizes of the objects and other object identifying information. Operating system 620 provides overall system functionality.

As shown in FIG. 6, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for object recognition comprising:
 displaying a video or image in real-time;
 displaying an interactive geometric shape adapted to be adjusted by a user to select an object in the displayed video or image;
 obtaining an aspect ratio of the interactive geometric shape;
 comparing the obtained aspect ratio to aspect ratios of a plurality of object templates;
 identifying at least one object having an aspect ratio corresponding to the aspect ratio of the interactive geometric shape;
 determining a resolution of the video or image based on the identified object.

2. The method of claim 1, further comprising:
 locating an object in the video or image by resizing the video or image to a scale based on the determined resolution.

3. The method of claim 1, wherein identifying at least one object having an aspect ratio corresponding to the aspect ratio of the interactive geometric shape comprises:
 identifying a plurality of objects having aspect ratios corresponding to the aspect ratio of the interactive geometric shape, wherein each of the plurality of identified objects has different dimensions; and
 determining a plurality of different resolutions of the video or image based on the plurality of identified objects.

4. The method of claim 3, further comprising:
 locating an object in the video or image by resizing the video or image to a scale based on the determined plurality of different resolutions.

5. The method of claim 1, further comprising:
 setting an image processing parameter based on the determined resolution.

6. The method of claim 1, wherein the determining a resolution of the video or image based on the identified object comprises:
 reducing a space of possible resolutions by limiting the possible resolutions to resolutions corresponding to the identified at least one object.

7. The method of claim 1, further comprising:
 receiving from a user input including additional information about the object.

8. A computer program product for object recognition, the computer program product comprising a non-transitory computer readable storage having program instructions embodied therewith, the program instructions executable by a computer, to cause the computer to perform a method comprising:
 displaying a video or image in real-time;
 displaying an interactive geometric shape adapted to be adjusted by a user to select an object in the displayed video or image;
 obtaining an aspect ratio of the interactive geometric shape;
 comparing the obtained aspect ratio to aspect ratios of a plurality of object templates;
 identifying at least one object having an aspect ratio corresponding to the aspect ratio of the interactive geometric shape; and
 determining a resolution of the video or image based on the identified object.

9. The computer program product of claim 8, further comprising program instructions for:
 locating an object in the video or image by resizing the video or image to a scale based on the determined resolution.

10. The computer program product of claim 8, wherein identifying at least one object having an aspect ratio corresponding to the aspect ratio of the interactive geometric shape comprises:
 identifying a plurality of objects having aspect ratios corresponding to the aspect ratio of the interactive geometric shape, wherein each of the plurality of identified objects has different dimensions; and
 determining a plurality of different resolutions of the video or image based on the plurality of identified objects.

11. The computer program product of claim 10, further comprising program instructions for:
 locating an object in the video or image by resizing the video or image to a scale based on the determined plurality of different resolutions.

12. The computer program product of claim 8, further comprising program instructions for:
 setting an image processing parameter based on the determined resolution.

13. The computer program product of claim 8, wherein the determining a resolution of the video or image based on the identified object comprises:
 reducing a space of possible resolutions by limiting the possible resolutions to resolutions corresponding to the identified at least one object.

14. The computer program product of claim 8, further comprising program instructions for:
 receiving from a user input including additional information about the object.

15. A system for object recognition, the system comprising a processor, memory accessible by the processor, and computer program instructions stored in the memory and executable by the processor to perform:
 displaying a video or image in real-time;
 displaying an interactive geometric shape adapted to be adjusted by a user to select an object in the displayed video or image;
 obtaining an aspect ratio of the interactive geometric shape;
 comparing the obtained aspect ratio to aspect ratios of a plurality of object templates;
 identifying at least one object having an aspect ratio corresponding to the aspect ratio of the interactive geometric shape; and
 determining a resolution of the video or image based on the identified object.

16. The system of claim 15, further comprising program instructions for:
 locating an object in the video or image by resizing the video or image to a scale based on the determined resolution.

17. The system of claim 15, wherein identifying at least one object having an aspect ratio corresponding to the aspect ratio of the interactive geometric shape comprises:
 identifying a plurality of objects having aspect ratios corresponding to the aspect ratio of the interactive geometric shape, wherein each of the plurality of identified objects has different dimensions; and
 determining a plurality of different resolutions of the video or image based on the plurality of identified objects.

18. The system of claim 17, further comprising program instructions for:

locating an object in the video or image by resizing the video or image to a scale based on the determined plurality of different resolutions.

19. The system of claim 15, further comprising program instructions for:

setting an image processing parameter based on the determined resolution.

20. The system of claim 15, wherein the determining a resolution of the video or image based on the identified object comprises:

reducing a space of possible resolutions by limiting the possible resolutions to resolutions corresponding to the identified at least one object.

\* \* \* \* \*